United States Patent [19]

Crill

[11] 4,021,260

[45] May 3, 1977

[54] STARCH VISCOSITY CONTROL AGENT USING AN ETHOXYLATED FATTY ALCOHOL

[75] Inventor: Marla S. Crill, Lisle, Ill.

[73] Assignee: Nalco Chemical Company, Oak Brook, Ill.

[22] Filed: Sept. 16, 1976

[21] Appl. No.: 723,863

Related U.S. Application Data

[62] Division of Ser. No. 654,146, Jan. 30, 1976, abandoned.

[52] U.S. Cl. .................................. 106/213; 127/33
[51] Int. Cl.$^2$ ...................... C08L 3/04; C08L 3/10
[58] Field of Search .................. 106/213; 526/105; 127/33

[56] References Cited

UNITED STATES PATENTS

| | | | |
|---|---|---|---|
| 3,211,564 | 10/1965 | Lauterbach | 536/105 X |
| 3,419,405 | 12/1968 | Lang | 127/33 |

Primary Examiner—Theodore Morris
Attorney, Agent, or Firm—John G. Premo; Robert A. Miller; Barry W. Sufrin

[57] ABSTRACT

An improved starch paste which contains from between 5 to 40% by weight of starch and from 0.01 to 5% by weight based on the weight of the starch of a fatty alcohol which has been reacted with from 1 – 20 moles of ethylene oxide.

2 Claims, No Drawings

STARCH VISCOSITY CONTROL AGENT USING AN ETHOXYLATED FATTY ALCOHOL

This is a division of application Ser. No. 654,146 filed on Jan. 30, 1976, now abandoned.

INTRODUCTION

Native starch is insoluble in cold water but forms a colloidal solution in hot water (above the gelatinization temperatures). Upon cooling from a hot solution, native gelatinized starch tends to retrograde to a rigid gel or stiff paste upon aging. This paste possesses only limited adhesive properties and remains partly insoluble even upon re-heating. This phenomenon is commonly known as retrogradation or "paste-back," and is generally believed to be caused by precipitation of amylose from the starch solution on cooling. Retrogradation is most pronounced in starches of cereal grains such as corn, rice, wheat, etc., and to a somewhat lesser degree in starches of root materials such as tapioca, sweet potato, potato, etc., and to an even lesser extent in the waxy varieties of corn and sorghum starches which contain relatively little amylose.

Obviously, the tendency to retrograde limits, and in many instances negates, the usefulness of native starch solutions. For example, native starch is of little use as an adhesive because of the marked decrease in adhesive properties and the lack of tack after retrogradation.

The problem of gelling is further aggravated when the starch is subjected to partial depolymerization, as is commonly done for modifying the solids viscosity relationship so that the viscosity of the cooked paste is reduced below that of the native starch. Such depolymerization is customarily done by treatment with acid, by treatment with alpha-amylase or starch-thinning enzymes, or by treatment with an oxidizing agent. Unfortunately, for the most cereal and root starches, such depolymerization treatments increase the tendency of the cooked starch to undergo viscosity increase on aging and gelling. This increased tendency may be a serious limitation in the selection and use of the depolymerized starch. Where the tendency toward viscosity increase on aging or cooling is too great, or if the starch paste tends to gel on aging or cooling, the usual remedy is to select the still thinner or more highly modified starch which shows this thickening or gelling tendency to a lesser degree. However, these thinner starches are more highly depolymerized and, consequently, are less effective as regards the strength and surface improvements imparted to the paper or textile on which they are used.

In general, all cereal starches, both modified and unmodified, can be classed as "gellable." Futhermore, for any particular starch, modified starch or starch derivative, the retrogradation or gelling properties are well known to those skilled in the art, and, therefore, there should be no difficulty in selecting those starches which can be used most advantageously in the starch size compositions of this invention.

THE INVENTION

In accordance with the invention, an improved starch paste which is reduced in its tendency to gel and which has lower viscosity at a given solids level is afforded, which paste contains from between 5 to 40% by weight of starch and from 0.01 to 5% by weight based on the weight of the starch of a fatty alcohol which has been reacted with from 1 – 20 moles of ethylene oxide. It is, of course, understood that the balance of the paste is water.

THE FATTY ALCOHOL

The fatty alcohol additive is prepared by ethoxylating a fatty alcohol with from between 1 – 20 moles of ethylene oxide. Preferably the amount of ethylene oxide used to treat the fatty alcohol is 2 – 10 moles.

The fatty alcohols contain from between 10 – 22 carbon atoms in chain length. They are preferably mixed fatty alcohols which contain between 12 – 16 carbon atoms. Such mixed fatty groups may be obtained from either animal fats or vegetable oils. These fatty groups may be straight or branch chained and may contain certain side chain constituents such as hydroxyl groups. Typical commercial materials that work exceedingly well in the practice of the invention is a $C_{12}$ – $C_{15}$ alcohol reacted with 9 moles of ethylene oxide. Another material is a $C_{12}$ – $C_{14}$ mixed fatty alcohol which has been ethoxylated with about 3 moles of ethylene oxide.

The invention is applicable to preparing starch paste from any gellable starch or modified starch. The invention works particularly well in treating starch paste made from pearl starch modified during its cooking with ammonium persulfate. This type of starch is discussed in detail in the disclosure of U.S. Pat No. 3,211,564. The ethoxylated fatty alcohols described above are capable of stabilizing starch pastes which have a starch content ranging between 5 – 40% by weight. The amount of ethoxylated fatty alcohol used to stabilize the starch paste may vary between 0.1% to 5% based on the weight of the starch with dosages ranging between 0.1 to 1% by weight giving excellent results in most cases.

EXAMPLES

To illustrate the invention, the following are given by way of example.

In many paper mills that utilize starch paste as a sizing material, it is customary to prepare such paste by means of a jet cooker. These cookers which operate at temperatures up to 350° F. and, in some instances, under pressure, are capable of preparing starch paste or sizes in a matter of a few seconds of reaction time. All of the examples were prepared using a laboratory jet cooker in a temperature range of 240° F. to 285° F. The particular starch used was a pearl starch that was modified using ammonium persulfate as per U.S. Pat. No. 3,211,564.

In all instances the various additives tested were admixed with the starch prior to its being gelatinized and before its admixture with the water.

In addition to testing ethoxylated fatty alcohols of the type used in the practice of the invention, certain of the tests presented hereinafter utilized commercial starch paste stabilizers. The various materials tested are listed below:

Composition No. 1:
 $C_{12}$ – $C_{15}$ alcohol reacted with 9 moles of ethylene oxide;

Composition No. 2:
 $C_{12}$ – $C_{14}$ alcohol reacted with 3 moles of ethylene oxide;

Composition No. 3:
 The mono glyceride of stearic acid;

Composition No. 4:
Calcium stearate.

In all of the above tests the starch pastes were prepared at the concentrations indicated and allowed to cool to room temperature. They were then reheated to 50° C. and measured at different Brookfield viscosities using different RPM's. After taking these measurements, the paste was allowed to cool to 25° C. and the viscosities were again remeasured, again using a Brookfield Viscosimeter. The results of these tests are presented below in Tables I and II:

instances it is possible to add the ethoxylated fatty alcohol to the starch after cooking or gelatinization although pre-addition is preferred. Unmodified as well as modified starches can be used.

Having thus described my invention, it is claimed:

1. A process for preparing an improved gelatinized starch paste which contains from between 5 to 40% by weight of starch which comprises adding to said starch paste prior to gelatinization from 0.01 to 5% by weight based on the weight of the starch of a modified fatty alcohol which has been reacted with 2 – 10 moles of ethylene oxide and then gelatinizing said starch.

2. The process of claim 1 where the starch is converted in the presence of ammonium persulfate.

TABLE I

| Test No. | Initial Starch Solids Treated with 1% Comp. 1 | VISCOSITY (RPM - Brookfield Viscosimeter) | | | | | | | | pH | Total Solids |
|---|---|---|---|---|---|---|---|---|---|---|---|
| | | 50° C. | | | | 25° C. | | | | | |
| | | 10 | 20 | 50 | 100 | 10 | 20 | 50 | 100 | | |
| 1. | 20% | 230 | 230 | 214 | 214 | 560 | 550 | 518 | 488 | 7 | 18.5% |
| 2. | 25% | 550 | 540 | 510 | 451 | 2020 | 1840 | 1990 | 1380 | 8.5 | 19.5% |
| 3. | 25% | 1080 | 970 | 990 | 712 | 2920 | 2570 | 2620 | 1784 | 7.5 | 21.5% |
| 4. | 30% | 2600 | 1500 | 1615 | 1156 | 4440 | 4040 | 3328 | 2868 | 7.5 | 25.2% |
| 5. | 35% | Gelled | | | | | | | | | |
| | Treated with 1% Comp. 2 | | | | | | | | | | |
| 6. | 30% | 980 | 910 | 848 | 852 | 2500 | 2350 | 2092 | 1910 | 7 | 25.2% |

TABLE II

| Test No. | Before Cooking | | | | After Cooking Na₂CO₃ % by wt. | pH | Total Solids | Viscosity at 100 rpm | |
|---|---|---|---|---|---|---|---|---|---|
| | Ammonium Persulfate % by wt. | Comp (3) % by wt. | Comp (4) % by wt. | Comp (1) % by wt. | | | | 50° C. | 25° C. |
| 1. | 1 | | | | | 9.5 | 13.5 | gel | gel |
| 2. | 1 | 1 | | | | 9.5 | 13.5 | gel | gel |
| 3. | 1 | | | | | 7 | 7.5 | gel | gel |
| 4. | 1 | 1 | | | | 7 | 7.5 | fluid | gel |
| 5. | 1 | | | | | 7 | 12.5 | gel | gel |
| 6. | 1 | 1 | | | | 7 | 12.5 | gel | gel |
| 7. | 1 | | | | | 7 | 12.5 | gel | gel |
| 8. | 1 | | 1 | | | 7 | 12.5 | gel | gel |
| 9. | 1 | | | 1 | | 7 | 12.5 | | 70 |
| 10. | 1 | | | 1 | | 7.5 | 13.5 | | 106.4 |
| 11. | 0.3 | | | 1 | 1.1 | 7 | 18.5 | 214 | 494 |
| 12. | 0.3 | | | 1 | 2.0 | 8.5 | 19.5 | 454 | 1380 |
| 13. | 0.3 | | | 1 | 1.1 | 7.5 | 21.5 | 712 | 1784 |
| 14. | 0.3 | | | 1 | 1.1 | 7.5 | 25.2 | 1156 | 2868 |
| 15. | 0.3 | | | 1 | 1.1 | 7.5 | 30.0 | gel | gel |
| 16. | 0.3 | | | 1* | 1.1 | 7.5 | 25.2 | 852 | 1910 |

*Comp. 2 instead of Comp. 1.

Based on the above, it is evident that a stabilized starch composition with lowered viscosities is afforded.

The invention is subject to various modifications without departing from the spirit thereof. In certain

* * * * *